United States Patent
Yonezawa et al.

(10) Patent No.: US 9,150,256 B2
(45) Date of Patent: Oct. 6, 2015

(54) VEHICLE HOOD STRUCTURE

(75) Inventors: Seiho Yonezawa, Toyota (JP); Koki Ikeda, Toyota (JP); Shinya Atsumi, Aichi-gun (JP); Nao Nakagawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/808,611

(22) PCT Filed: Jul. 8, 2010

(86) PCT No.: PCT/JP2010/061645
§ 371 (c)(1),
(2), (4) Date: Jan. 7, 2013

(87) PCT Pub. No.: WO2012/004881
PCT Pub. Date: Jan. 12, 2012

(65) Prior Publication Data
US 2013/0106142 A1   May 2, 2013

(51) Int. Cl.
*B62D 25/10* (2006.01)
*B60R 21/34* (2011.01)

(52) U.S. Cl.
CPC ............... *B62D 25/10* (2013.01); *B60R 21/34* (2013.01); *B60R 2021/343* (2013.01)

(58) Field of Classification Search
CPC ...... B62D 25/10; B62D 25/105; B60R 21/34; B60R 2021/343
USPC .................................................... 296/193.11
See application file for complete search history.

(56) References Cited

U.S. PATENT DOCUMENTS

| | | | |
|---|---|---|---|
| 7,150,496 B2 * | 12/2006 | Fujimoto | 296/187.04 |
| 7,988,222 B2 * | 8/2011 | Fujimoto | 296/187.04 |
| 2004/0021342 A1 | 2/2004 | Fujimoto | |
| 2005/0082874 A1 * | 4/2005 | Ikeda et al. | 296/193.11 |
| 2006/0163915 A1 * | 7/2006 | Ikeda et al. | 296/193.11 |
| 2010/0314907 A1 | 12/2010 | Iwano et al. | |

FOREIGN PATENT DOCUMENTS

| | | |
|---|---|---|
| JP | 2003-205866 A | 7/2003 |
| JP | 2005-075163 A | 3/2005 |
| JP | 2006-044542 A | 2/2006 |
| JP | 2006-044543 A | 2/2006 |
| JP | 2007098963 A | 4/2007 |
| JP | 2009040168 A | 2/2009 |
| WO | 2009098939 A1 | 8/2009 |

* cited by examiner

*Primary Examiner* — Glenn Dayoan
*Assistant Examiner* — Melissa A Black
(74) *Attorney, Agent, or Firm* — Gifford, Krass, Sprinkle, Anderson & Citkowski, P.C.

(57) ABSTRACT

A vehicle hood structure capable of improving impact absorption ability prior to a secondary impact when an impacting body impacts the hood. Front end portions of beads of a wave shaped section are arranged in a line in hood plan view. A front wall section is provided further to the hood front side than the wave shaped section and is formed inclined towards the hood bottom side on progression towards the hood front and running substantially along the vehicle width direction. The wave shaped section and the front wall section are connected together by a ledge section formed running substantially along the hood width direction.

2 Claims, 10 Drawing Sheets

VEHICLE HOOD STRUCTURE

TECHNICAL FIELD

The present invention relates to a vehicle hood structure that is applied to a vehicle such as an automobile.

BACKGROUND ART

Known vehicle hood structures include structures wherein a hood outer panel and a hood inner panel are coupled together. From the perspective of pedestrian protection, in such structures the hood inner panel may include plural beads arranged alongside each other with length directions oriented in the vehicle body front-rear direction, forming a wave shaped profile (see for example Patent Document 1). In such structures, when an impacting body impacts the hood (appropriately referred to below as "primary impact"), a high proportion of the load acting on the impacting body prior to the impacting body impacting a rigid object at the bottom side of the hood inner panel (appropriately referred to below as "secondary impact") is load due to the inertia of the hood panel.
Patent Document 1: Japanese Patent Application Laid-Open (JP-A) No. 2003-205866

DISCLOSURE OF INVENTION

Technical Problem

However, in such structures, the load acting on the impacting body prior to secondary impact is strongly influenced by the mass of the hood panel, and there is accordingly room for improvement from the perspective of improving impact absorption ability prior to secondary impact.

In consideration of the above issues, an object of the present invention is to obtain a vehicle hood structure capable of improving impact absorption ability prior to secondary impact when an impacting body impacts the hood.

Solution to Problem

A vehicle hood structure of a first aspect of the present invention includes a hood outer panel that configures an outer panel of a hood, and a hood inner panel that is disposed at a hood bottom side of the hood outer panel and that is coupled to the hood outer panel to configure an inner panel of the hood. The hood inner panel includes: a wave shaped section that is provided at a central region of the hood inner panel and that includes protruding portions oriented with a length direction in a hood front-rear direction to give protruding shapes on the hood outer panel side, and indented portions oriented with a length direction in the hood front-rear direction to give indented shapes on the hood outer panel side, the protruding portions and the indented portions provided alternately to form a wave shaped profile, and with hood front-rear direction front end portions of the protruding portions arranged in a line in a hood plan view; a front wall section that is provided to the hood inner panel further to a hood front side than the wave shaped section, that is inclined towards the hood bottom side on progression towards a hood front, and that is formed substantially along the hood width direction; and a ledge section that is formed substantially along the hood width direction and that connects together the wave shaped section and the front wall section in the hood inner panel.

According to the vehicle hood structure of the first aspect of the present invention, the hood inner panel is disposed at the hood bottom side of the hood outer panel and coupled to the hood outer panel, and the hood inner panel is formed with the wave shaped section at a central portion thereof. The wave shaped section is alternately provided with the protruding portions and the indented portions respectively orientated with length directions in the hood front-rear direction to give a wave shaped profile. The wave shaped section accordingly has a comparatively high rigidity with respect to impact load.

The front end portions of the protruding portions of the wave shaped section are arranged in a line in hood plan view, and the front wall section is provided further to the hood front side than the wave shaped section, inclined towards the hood bottom side on progression towards the hood front, and formed substantially along the hood width direction. Accordingly, when an impacting body impacts the hood and load is input to the wave shaped section, bending deformation towards the hood bottom side occurs in the ledge section that has a lower rigidity than the wave shaped section. The front wall section deforms so as to bulge out diagonally towards a hood front upper side accompanying the deformation of the ledge section. The hood outer panel displaces towards the hood bottom side due to the impact load, causing the hood outer panel to (directly or indirectly) contact a rear end portion side of the front wall section, after which the contact position of the hood outer panel and the front wall section gradually changes towards the hood front side. Accordingly, the rear end portion side of the front wall section undergoes bending deformation such that a plastic deformation location deforms so as to move progressively and continuously towards the hood front side (ironing deformation). Energy expended in plastic deformation is absorbed, thereby improving impact absorption ability prior to secondary impact.

A second aspect of the present invention is the vehicle hood structure of the first aspect wherein a ridge line configuring the location of connection between the ledge section and the front wall section is formed along the hood width direction in a straight line shape in a hood plan view.

According to the vehicle hood structure of the second aspect of the present invention, the ridge line configuring the location of connection between the ledge section and the front wall section is formed along the hood width direction in a straight line shape in hood plan view. When an impacting body impacts the hood, the plastic deformation location of the front wall section therefore becomes a straight line shaped fold-bend deformation portion along the hood width direction and moves stably towards the hood front side. Namely, the front wall section deforms with a stable deformation mode.

Advantageous Effects of Invention

As described above, the vehicle hood structure according to the first aspect of the present invention exhibits the excellent advantageous effect of enabling impact absorption ability prior to secondary impact when an impacting body impacts the hood to be improved.

The vehicle hood structure according to the second aspect of the present invention exhibits the excellent advantageous effect of increasing the precision of impact absorption ability prior to secondary impact when an impacting body impacts the hood.

BEST MODE FOR CARRYING OUT THE INVENTION

<First Exemplary Embodiment>

Explanation follows regarding a vehicle hood structure according to a first exemplary embodiment of the present invention, with reference to FIG. 1 to FIG. 10. In the drawings the arrow FR indicates the vehicle front side, the arrow UP indicates the vehicle top side, and the arrow W indicates the vehicle width direction as appropriate. In a closed state of the hood, the hood front-rear direction is the same direction as the vehicle front-rear direction, the hood top-bottom direction is the same direction as the vehicle top-bottom direction, and the hood width direction is the same direction as the vehicle width direction.

Figure 1:
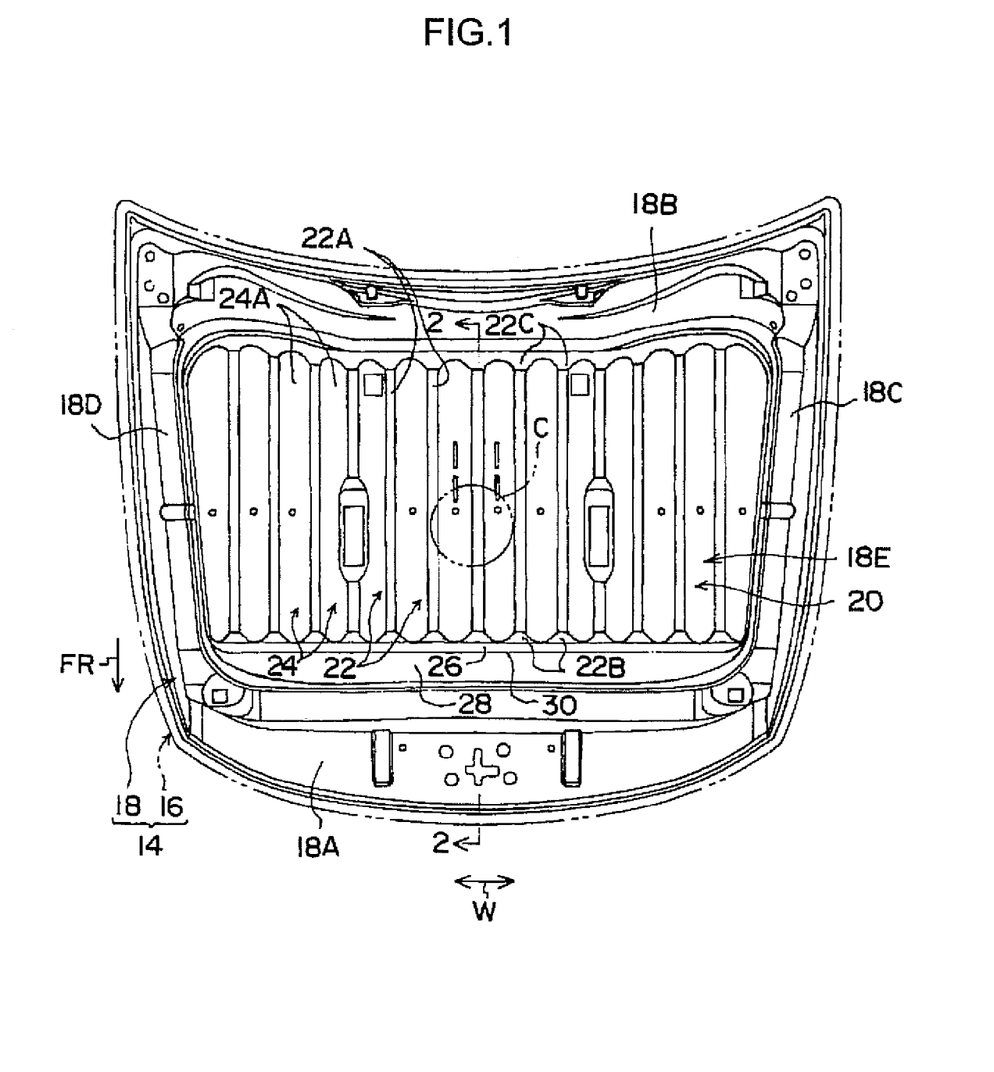
FIG. 1 is a plan view illustrating a hood applied with a vehicle hood structure according to a first exemplary embodiment of the present invention (with elements such as a hood outer panel shown in a see-through state).
Figure 2:
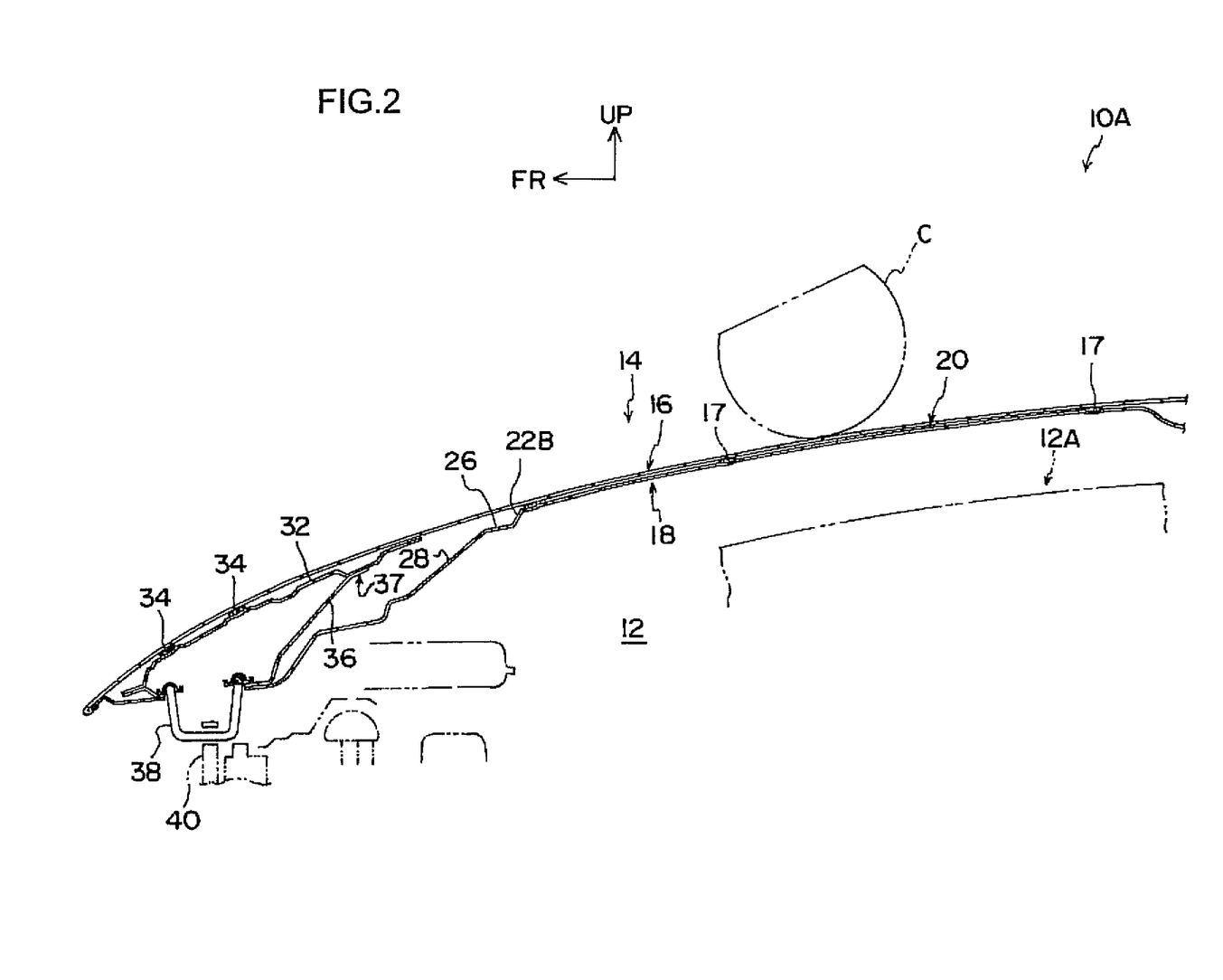
FIG. 2 is an enlarged cross-section of a state sectioned along line 2-2 of FIG. 1.

FIG. 1 is a plan view illustrating a hood 14 applied to a vehicle hood structure according to the present exemplary embodiment with elements such as a hood outer panel 16 (refer to the double-dash intermittent line) shown in a see-through state. FIG. 2 is an enlarged cross-section taken along line 2-2 in FIG. 1.

As shown in FIG. 2, a vehicle front section 10A of an automobile (vehicle) is provided with a hood (engine hood) 14 that covers an engine compartment 12 such that the engine compartement 12 can be opened and closed. A rigid body 12A such as a power unit is installed inside the engine compartment 12 covered by the hood 14.

The hood 14 is made out of metal (out of an aluminum alloy in the present exemplary embodiment, by way of an example). As shown in FIG. 1, the hood 14 is set such that the hood width direction dimension is longer than the hood front-rear direction dimension. Hinges (not shown in the drawings) are provided at both sides of a hood front-rear direction rear end portion of the hood 14. The hood 14 is according capable of rotational movement about a hood width direction axis at the hinges (not shown in the drawings), namely capable of opening and closing.

As shown in FIG. 2, the hood 14 is configured including a hood outer panel 16 configuring an outside panel of the hood 14 and extending substantially along the vehicle front-rear direction, and a hood inner panel 18 disposed at the hood bottom side of the hood outer panel 16 and coupled to the hood outer panel 16, the hood inner panel 18 configuring an inside panel of the hood 14. Dent reinforcement 32 is disposed at a central region of a hood front-rear direction front end portion of the hood 14 and striker reinforcement 36 is disposed at the hood bottom side of the dent reinforcement 32.

The striker reinforcement 36 is a curved plate shaped metal reinforcement member disposed between the hood outer panel 16 and the hood inner panel 18 to secure rigidity at the periphery of a hood striker 38. Note that configuration is made such that the hood striker 38 is latched by a latch 40 on the vehicle body side when the hood 14 is in a closed position. The hood 14 is retained in the closed position by the latch 40 latching to the hood striker 38. A hood front-rear direction intermediate portion of the striker reinforcement 36 is joined to the hood inner panel 18, and hood front-rear direction end portions of the striker reinforcement 36 are joined to the back face of hood front-rear direction end portion sides of the dent reinforcement 32.

The dent reinforcement 32 is made from metal in a plate shape, and is disposed between the hood outer panel 16 and the hood inner panel 18 towards the hood outer panel 16 side. The dent reinforcement 32 is a reinforcement member for suppressing deformation of the hood outer panel 16 when the hood 14 is closed. The dent reinforcement 32 extends substantially along the hood outer panel 16 and is joined (fixed) to the back face of the hood outer panel 16 by mastic 34.

The hood outer panel 16 and the hood inner panel 18 are both formed by press forming an aluminum alloy sheet (in the present exemplary embodiment, for example, a HS standard 6000 series aluminum alloy sheet is used). The plate thickness of the hood outer panel 16 and the plate thickness of the hood inner panel 18 are set in consideration of various perspectives such as achieving a weight saving and pedestrian protection characteristics. An outer peripheral portion of the hood outer panel 16 is coupled to the hood inner panel 18 by hemming processing. In an assembled state of the hood outer panel 16 and the hood inner panel 18 (a panel structure body state), the two panels form a closed cross-section structure (what is referred to as a clam shell structure in the present exemplary embodiment), forming a gap (void) in the hood top-bottom direction between the two panels.

As shown in FIG. 1, an outer peripheral edge section of the hood inner panel 18 is configured by a front edge portion 18A, a rear edge portion 18B, and left and right hood width direction edge portions 18C, 18D. A central region 18E is configured inside the front edge portion 18A, the rear edge portion 18B and the left and right hood width direction edge portions 18C, 18D.

Plural beads 22 serving as protruding portions are formed in the central region 18E of the hood inner panel 18. Each bead 22 is oriented with the length direction in the hood front-rear direction is provided with apex portions 22A such that, when viewed in cross-section orthogonal to the length direction of the beads 22, the panel (the hood inner panel 18) in the central region 18E rises up towards the hood outer panel 16 side to form protruding shapes. The apex portions 22A are formed with a flat profile. The front faces of the apex portions 22A are disposed substantially parallel to the hood outer panel 16. Part of the apex portions 22A of the beads 22 are joined to the back face of the hood outer panel 16 through mastic 17 (see FIG. 2), an adhesive.

A hood front-rear direction front end portion 22B of each of the beads 22 reaches the vicinity of the front edge portion 18A of the hood inner panel 18, and the front end portions 22B are arranged in a line in hood plan view. More specifically, the shape of the termination of the front end portions 22B of each of the beads 22 (the trapezoid shape formed by the positions where they rise up) forms a straight line along the hood width direction in hood plan view, and the terminal positions (starting positions) of the beads 22 are set on an imaginary straight line across the hood width direction with aligned hood front-rear direction positions in hood plan view. Hood front-rear direction rear end portions 22C of each of the beads 22 reach the vicinity of the rear edge portion 18B of the hood inner panel 18. The beads 22 configure a framework that raises the hood front-rear direction bending rigidity of the central region 18E of the hood inner panel 18.

Indented portions 24 having an indented profile on the hood outer panel 16 side and oriented with their length directions in the hood front-rear direction are respectively formed between adjacent beads 22 in the central region 18E of the hood inner panel 18 in which the plural beads 22 are lined up in parallel. Bottom portion 24A sides of the indented portions 24 are formed with a curved circular arc profile (curved line profile) cross-section as viewed along a plane orthogonal to the length direction of the indented portions 24.

A wave shaped section 20 with a wave shaped (wave form) cross-section is formed across virtually the entire region of the central region 18E by the beads 22 (protruding portions) and indented portions 24 alternately provided across the hood width direction in the above manner. The wave shaped section 20 faces the rigid body 12A inside the engine compartment 12, as shown in FIG. 2.

Note that the wave shaped profile of the wave shaped section 20 illustrated in FIG. 1 is set, for example, with a wavelength p of 70 mm≤p≤100 mm. When the apex portions 22A are formed with a flat profile as in the present exemplary embodiment, the wavelength p is the horizontal distance (hood width direction distance) from a width direction central position (a wavelength direction central position) of a given apex portion 22A to the width direction central portion (the wavelength direction central position) of an adjacent apex position 22A. A height h of the wave shaped profile of the wave shaped section 20 (in other words, the height of the beads 22) is set, for example, at 8.5 mm≤h≤10.5 mm, from the viewpoint of securing rigidity of the wave shaped section 20.

A hood front-rear direction front end portion of the central region 18E of the hood inner panel 18 is formed with a front wall section 28 substantially along the hood width direction. The front wall section 28 is provided further to the hood front side than the wave shaped section 20, and as shown in FIG. 2, is inclined towards the hood bottom side on progression towards the hood front. In the present exemplary embodiment, the front wall section 28 is disposed further to the hood rear side than a rear end side join portion 37 between the striker reinforcement 36 and the dent reinforcement 32.

As shown in FIG. 1, the hood inner panel 18 is formed with a ledge section 26 that connects together the wave shaped section 20 and the front wall section 28. The ledge section 26 is formed in a straight line shape substantially along the hood width direction. The ledge section 26 is formed with a flat profile with a hood top-bottom direction step formed between the apex portions 22A of the beads 22 and the ledge section 26. A ridge line 30 that is the connection location of the ledge section 26 and the front wall section 28 is formed in a straight line shape along the hood width direction in hood plan view.

Explanation follows regarding operation and advantageous effects of the above exemplary embodiment.

As shown in FIG. 1, the wave shaped section 20 formed to the central region 18E of the hood inner panel 18 has a comparatively high rigidity to impact load due to being formed with a wave shaped profile by the alternately provided beads 22 (protruding portions) and indented portions 24 with length directions respectively oriented in the hood front-rear direction.

Figure 3:
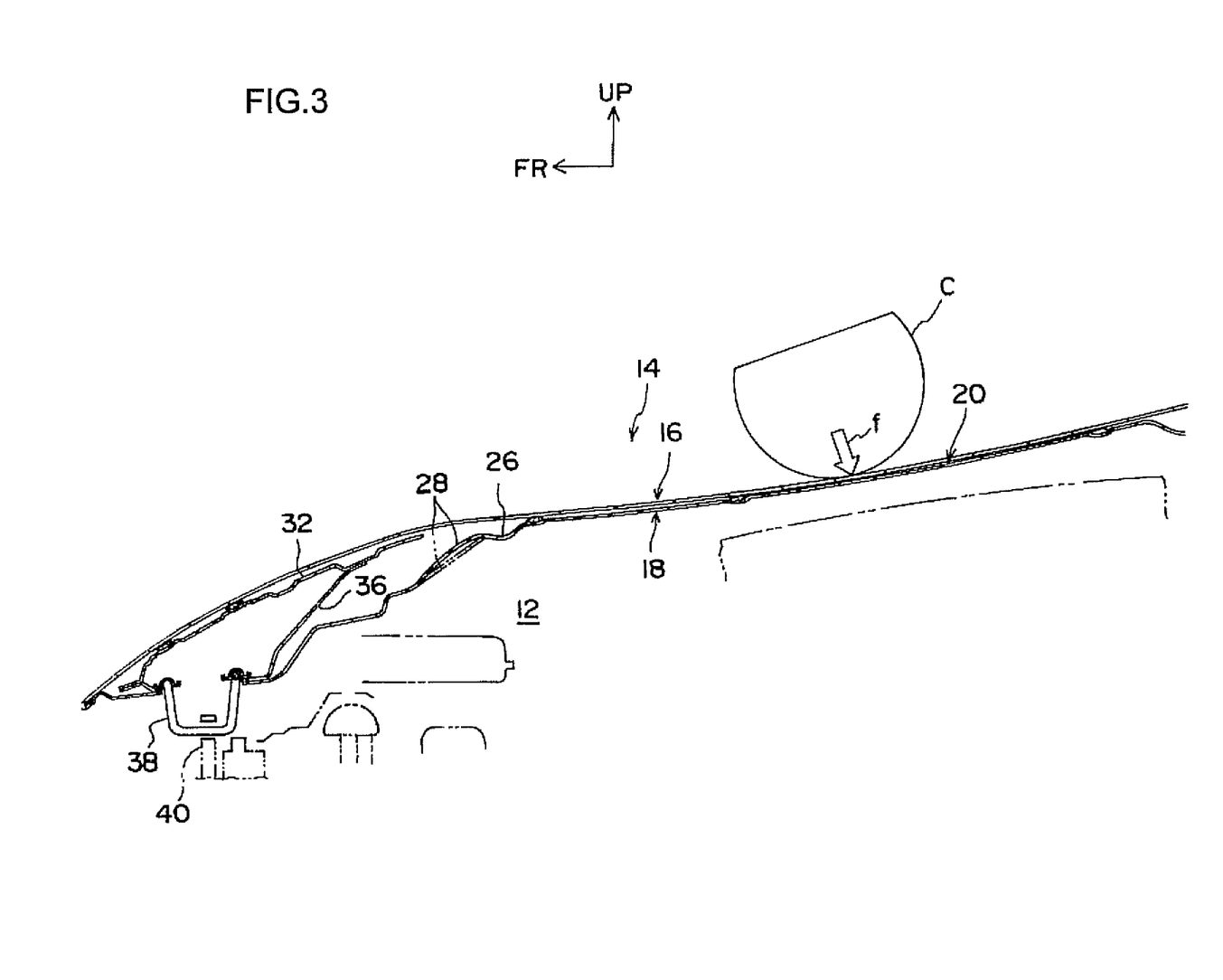
FIG. 3 is a side-view cross-section of the same section plane as in FIG. 2, illustrating a state where a head impactor has impacted the hood.

The front end portions 22B of the beads 22 of the wave shaped section 20 are arranged in a line in as seen in hood plan view, and the front wall section 28 provided further to the hood front side than the wave shaped section 20 is formed running substantially along the hood width direction and inclined towards the hood bottom side on progression towards the hood front. The wave shaped section 20 and the front wall section 28 are connected by the ledge section 26 that is formed substantially along the hood width direction. Accordingly, as shown in FIG. 3, when a head impactor C that is modeled on the head of a pedestrian and serves as an impacting body impacts the hood 14, inputting an impact load f to the wave shaped section 20, bending deformation towards the hood bottom side occurs in the ledge section 26 that has lower rigidity than the wave shaped section 20. The front wall section 28 deforms to bulge diagonally towards a hood front upper side, accompanying the deformation of the ledge section 26. Note that in FIG. 3, the state of the front wall section 28 prior to deformation is indicated by the double-dash intermittent line.

Figure 4:
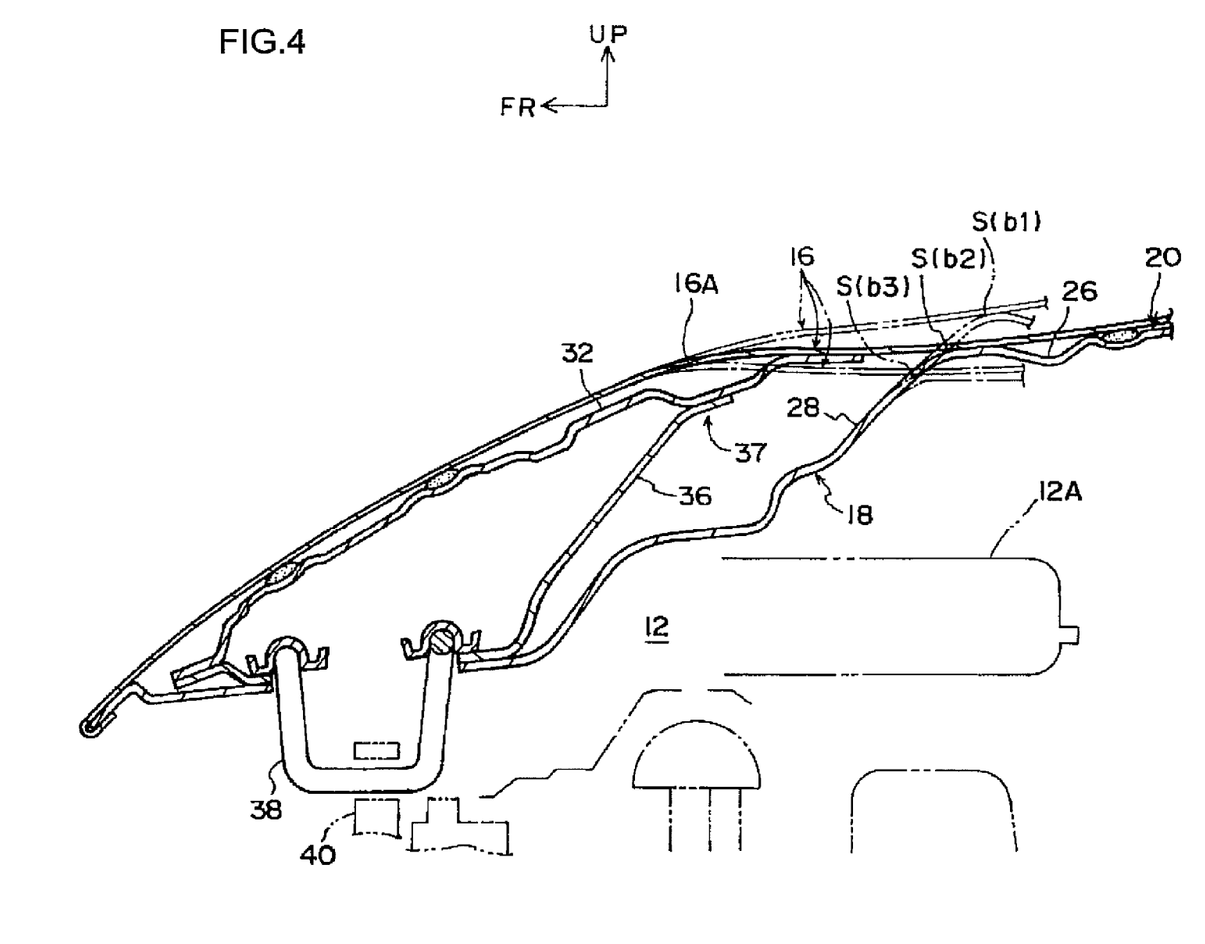
FIG. 4 is a side-view cross-section illustrating a state in which a head impactor has impacted the hood and the front wall section of the hood inner panel is undergoing ironing deformation.

In response, as shown in FIG. 4, since the hood outer panel 16 displaces towards the hood bottom side under the impact load f, the hood outer panel 16 contacts the rear end portion side of the front wall section 28, after which the contact position of the hood outer panel 16 and the front wall section 28 gradually changes towards the hood front side. Accordingly, a rear end portion side of the front wall section 28 undergoes bending deformation such that a plastic deformation location S deforms so as to move progressively and continuously towards the hood front side (namely ironing deformation occurs with continuous bending deformation in the front wall section 28). In other words, ironing deformation of the front wall section 28 is induced by the ledge section 26 undergoing bending deformation.

More specific explanation follows regarding the ironing deformation of the front wall section 28, with reference to FIG. 4. When the hood outer panel 16 contacts the front wall section 28, the plastic deformation location S moves progressively and continuously from a deformation start position b1 indicated by the double-dash intermittent line, through a mid-deformation position b2 indicated by the unbroken line, and then to a position b3 indicated by the single-dash intermittent line. The continuous movement of the plastic deformation location S continues until the hood inner panel 18 impacts the rigid body 12A (secondary impact) at the bottom side of the hood inner panel 18. Reaction force (deformation load) due to the ironing deformation of the front wall section 28 occurs continuously in the hood inner panel 18 prior to secondary impact. Impact absorption ability prior to secondary impact is improved due to the energy expended in plastic deformation of the front wall section 28 being absorbed.

Note that during deformation of the front wall section 28, large plastic distortion occurs in the front wall section 28, and large plastic deformation occurs at a bending deformation portion 16A of the hood outer panel 16 (a location to the hood top side of the rear end side join portion 37 between the striker reinforcement 36 and the dent reinforcement 32).

As shown in FIG. 1, in the vehicle hood structure of the present exemplary embodiment, the ridge line 30 that is the connection location of the ledge section 26 and the front wall section 28 is formed in a straight line shape along the hood width direction in hood plan view. The plastic deformation location S illustrated in FIG. 4 therefore becomes a straight line fold-bend deformation portion along the hood width direction and moves stably towards the hood front side. Namely, the precision of impact absorption ability prior to secondary impact is raised due to the front wall section 28 deforming with a stable deformation mode.

Supplementary explanation follows of the above, drawing comparison with a comparative structure. For example, the operation and advantageous effects described above would not be obtained in a comparative structure wherein a ledge section (26) is not present between a wave shaped section (20) and a front wall section (28), and the front end of the wave shaped section (20) undulates in plan view. Namely, in such a comparative structure, when the head impactor (C) impacts the hood (14) and impact load (f) is input to the wave shaped section (20), hardly any bending deformation (fold-bend deformation) occurs between the wave shaped section (20) and the front wall section (28), and the front wall section (28) accordingly displaces towards the hood bottom side whilst hardly deforming at all. Accordingly, very little deformation load can be obtained from the hood inner panel (18). By contrast, in the present exemplary embodiment, since the front wall section 28 undergoes progressive deformation as described above, the deformation load due to the hood inner panel 18 increases.

Figure 9:
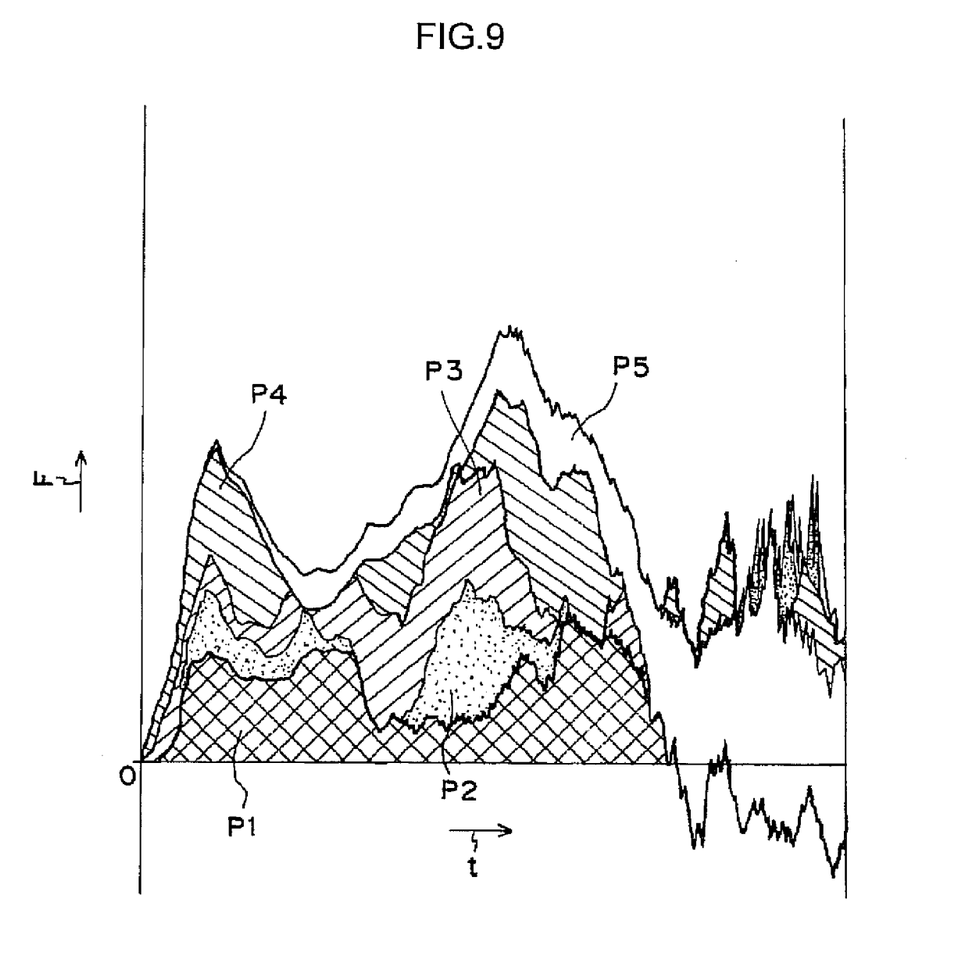
FIG. 9 is a stacked graph illustrating a relationship between load prior to secondary impact and time in a hood of a comparative structure.
Figure 10:
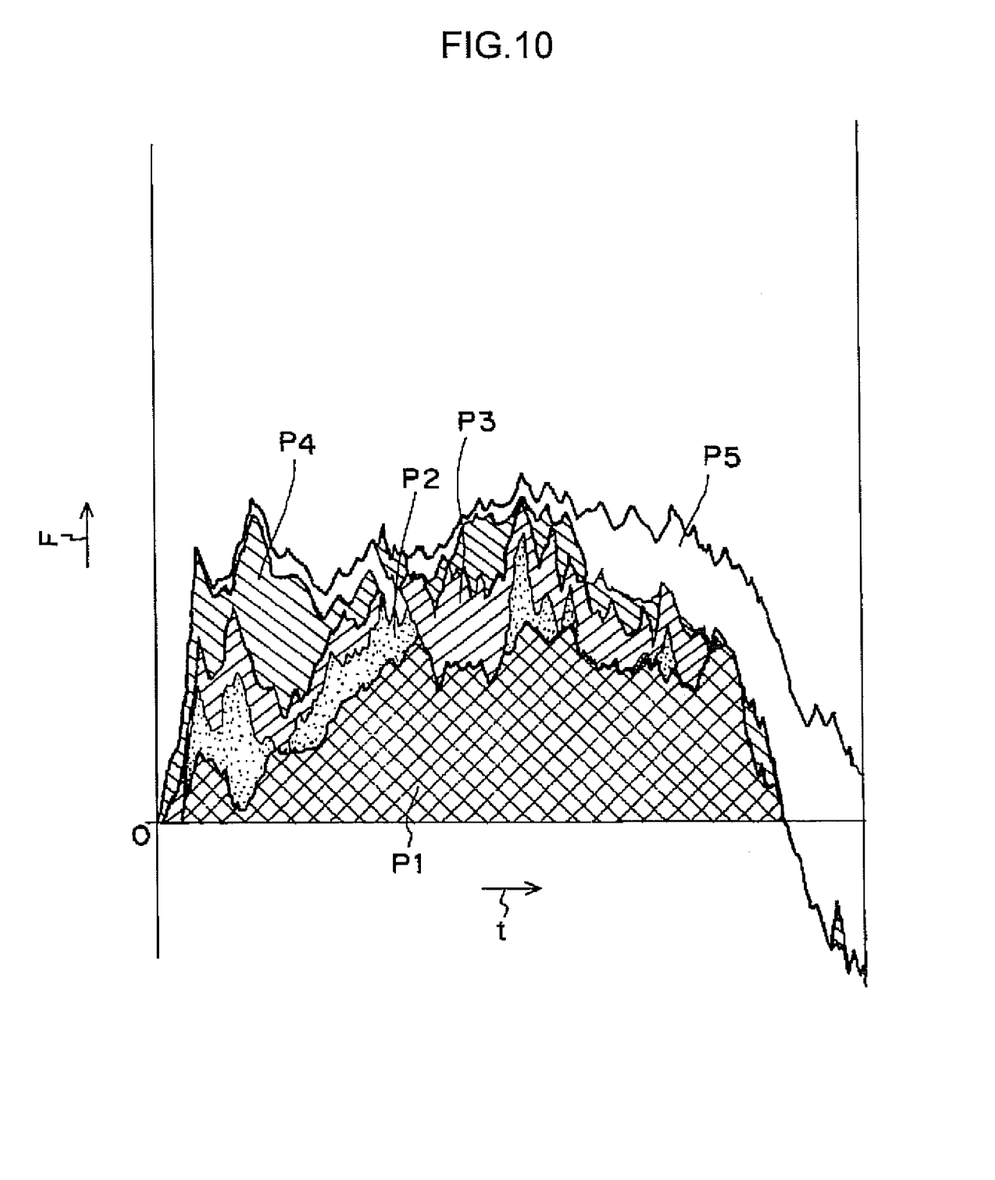
FIG. 10 is a stacked graph illustrating a relationship between load prior to secondary impact and time in a hood applied with the vehicle hood structure of the first exemplary embodiment of the present invention.

Supplementary explanation follows regarding load due to inertia and deformation load of the hood (14) during an impact of the head impactor (C), with reference to FIG. 9 and FIG. 10. FIG. 9 and FIG. 10 are stacked graphs illustrating relationship characteristics of a load F (N) prior to secondary impact and time t (ms) when the head impactor (C) is caused to impact the hood (14) under Japan New Car Assessment Program (JNCAP) test conditions. FIG. 9 shows characteristics of a hood of the comparative structure, and FIG. 10 shows characteristics of a hood with the same structure as the present exemplary embodiment with the beads (22) having a height of 8.5 mm. In FIG. 9 and FIG. 10, P1 indicates the deformation load of the hood inner panel, P2 indicates the load due to inertia of the hood inner panel, P3 indicates the deformation load of the hood outer panel, and P4 indicates the load due to inertia of the hood outer panel, whilst P5 indicates load (deformation load and load due to inertia) at other locations.

As shown in FIG. 9 and FIG. 10, it can be seen that in the hood according to the comparative structure (see FIG. 9), there is a larger proportion of load due to the hood inner panel inertial load P2 and a larger proportion of load due to the hood outer panel inertial load P4 than in the hood according to the present exemplary embodiment (see FIG. 10). It can be seen that the hood according to the present exemplary embodiment (see FIG. 10) has a larger proportion of load due to the hood inner panel deformation load P1 than in the hood according to the comparative structure (see FIG. 9). In other words, in the hood according to the present exemplary embodiment (see FIG. 10), deformation load is the dominant load acting on the head impactor (C) prior to secondary impact. It is accordingly more difficult for the mass of the hood to affect the load than in the hood of the comparative structure (see FIG. 9).

Explanation follows with reference to graphs FIG. 5 to FIG. 8 regarding impact absorption characteristics of a hood applied with the vehicle hood structure according to the present exemplary embodiment, drawing comparison with the impact absorption characteristics of a hood according to the comparative structure.

Figure 5:
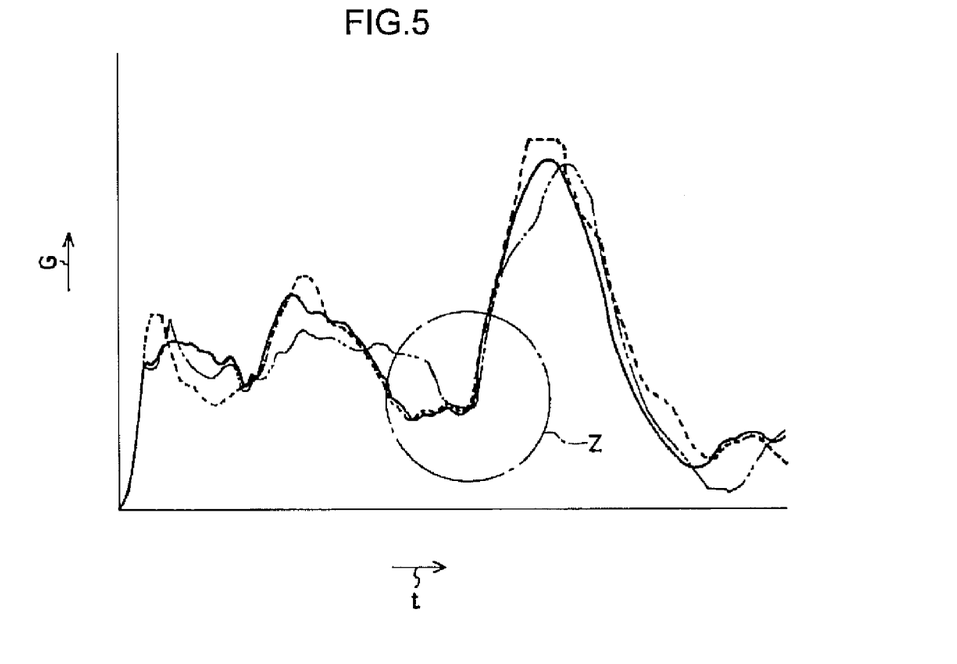
FIG. 5 is a graph illustrating a relationship between a compound G and time when a head impactor has impacted a hood applied with the vehicle hood structure of the first exemplary embodiment of the present invention and a hood of a comparative structure under Japan New Car Assessment Program child test conditions.
Figure 6:
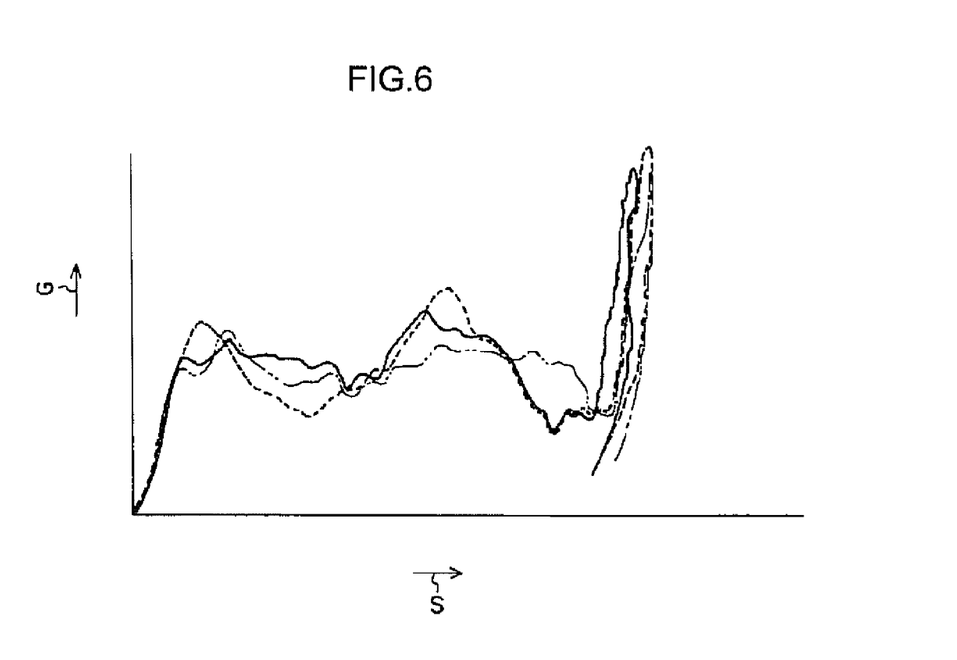
FIG. 6 is a graph illustrating a relationship between a synthetic G and stroke when a head impactor has impacted a hood applied with the vehicle hood structure of the first exemplary embodiment of the present invention and a hood of a comparative structure under Japan New Car Assessment Program child test conditions.

FIG. 5 and FIG. 6 illustrate characteristics when a head impactor is caused to impact a hood under Japan New Car Assessment Program (JNCAP) child test conditions. FIG. 5 is a graph showing a relationship between a triaxial compound acceleration G (compound G (m/s$^2$)) and time t (ms). FIG. 6 is a graph showing a relationship between acceleration G (forward-backward G (m/s$^2$) in the head impactor impact direction and stroke S (mm).

Figure 7:
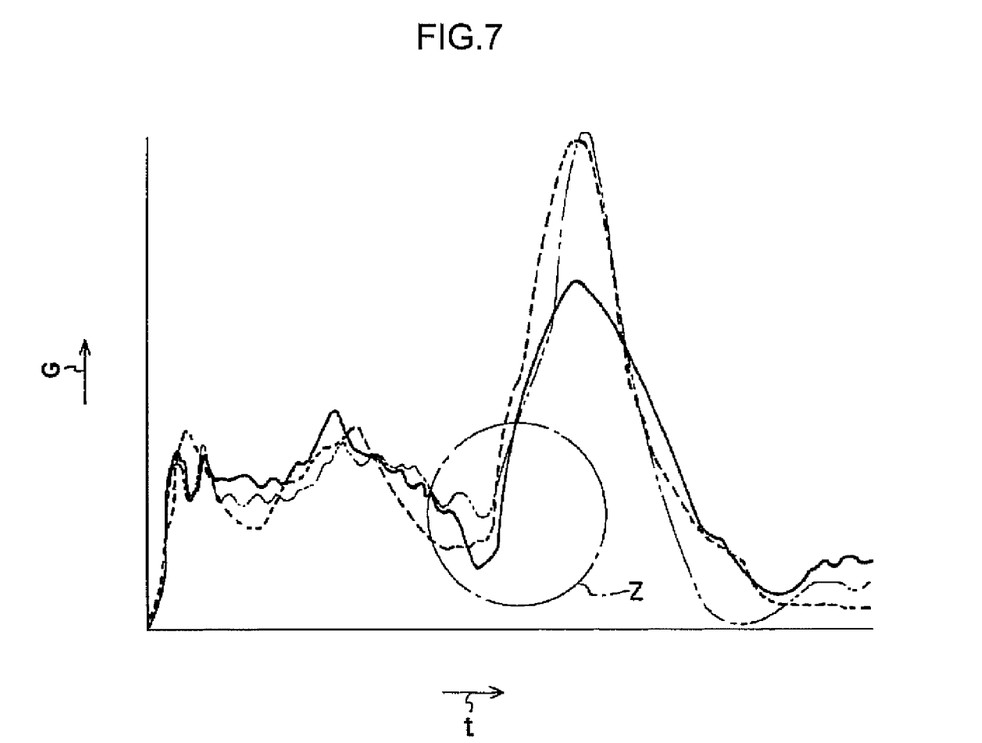
FIG. 7 is a graph illustrating a relationship between a compound G and time when a head impactor has impacted a hood applied with the vehicle hood structure of the first exemplary embodiment of the present invention and a hood of a comparative structure under European Standards child conditions.
Figure 8:
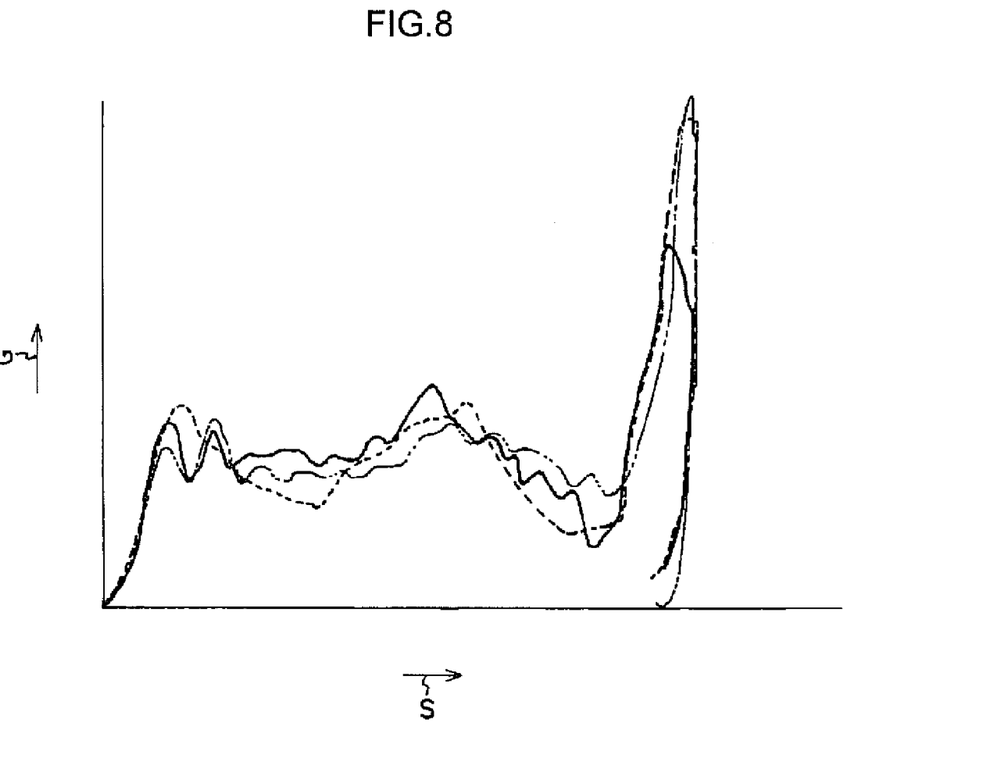
FIG. 8 is a graph illustrating a relationship between a forward-backward G and stroke when a head impactor impacts a hood applied with the vehicle hood structure of the first exemplary embodiment of the present invention and a hood of a comparative structure under European Standards child conditions.

FIG. 7 and FIG. 8 illustrate characteristics when a head impactor is caused to impact under European Standards child test conditions. FIG. 7 is a graph showing a relationship between a triaxial compound acceleration G (compound G (m/s$^2$)) and time t (ms). FIG. 8 is a graph showing a relationship between acceleration G (forward-backward G (m/s$^2$) in the head impactor impact direction and stroke S (mm).

Note that the hood impact position is indicated by the head impactor C shown by the double-dash intermittent line in FIG. 1, and is set as a central portion of the wave shaped section (20) in plan view. The head impactor impact direction acceleration value is effectively virtually the same as the triaxial compound acceleration value.

In FIG. 5 to FIG. 8, the solid line indicates characteristics of a hood with a bead (22) height of 10.5 mm in a structure the same as the vehicle hood structure according to the present exemplary embodiment. The double-dash intermittent line indicates characteristics of a hood with a bead (22) height of 8.5 mm in a structure the same as the vehicle hood structure according to the present exemplary embodiment. The dotted line indicates characteristics of a hood of the comparative structure employed to generate FIG. 9. In FIG. 5 and FIG. 7, the region enclosed by the single-dash intermittent line Z indicates the time of secondary impact and immediately before and after.

As shown in FIG. 5 and FIG. 7, a falloff in acceleration prior to secondary impact is slightly suppressed in the vehicle hood structure according to the present exemplary embodiment (see the solid line and double-dash intermittent line) compared to in the comparative structure (see the dotted line). In FIG. 5 to FIG. 8, it can be seen that the acceleration is smoothed out more in the vehicle hood structure according to the present exemplary embodiment (see the solid line and double-dash intermittent line) than in the comparative structure (see the dotted line). Namely, in the vehicle hood structure according to the present exemplary embodiment (see the solid line and double-dash intermittent line), load prior to secondary impact is controlled and the amount of energy absorbed prior to secondary impact is increased.

Further explanation follows, drawing comparison with another comparative structure. For example, in another comparative structure wherein beads formed to a hood inner panel is configured to readily collapse under vertical pressure during secondary impact by setting large bead heights and widths, although impact absorption ability is raised after secondary impact, the impact absorption ability prior to secondary impact is still greatly influenced by the mass of the hood panel. Namely, even with such a comparative example, load due to inertia is a large proportion of load prior to secondary impact. Accordingly, it is difficult to control load (reaction force) prior to secondary impact. By contrast, in the vehicle hood structure of the present exemplary embodiment it is easier to control load (reaction force) prior to secondary impact due to raising the proportion of load exhibited by deformation load in the hood inner panel 18 (see FIG. 2, etc.) in the load prior to secondary impact.

As explained above, according to the vehicle hood structure of the present exemplary embodiment, the impact absorption ability prior to secondary impact can be improved when the head impactor C (impacting body) illustrated for example in FIG. 2 impacts the hood 14.

<Second Exemplary Embodiment>

Figure 11:
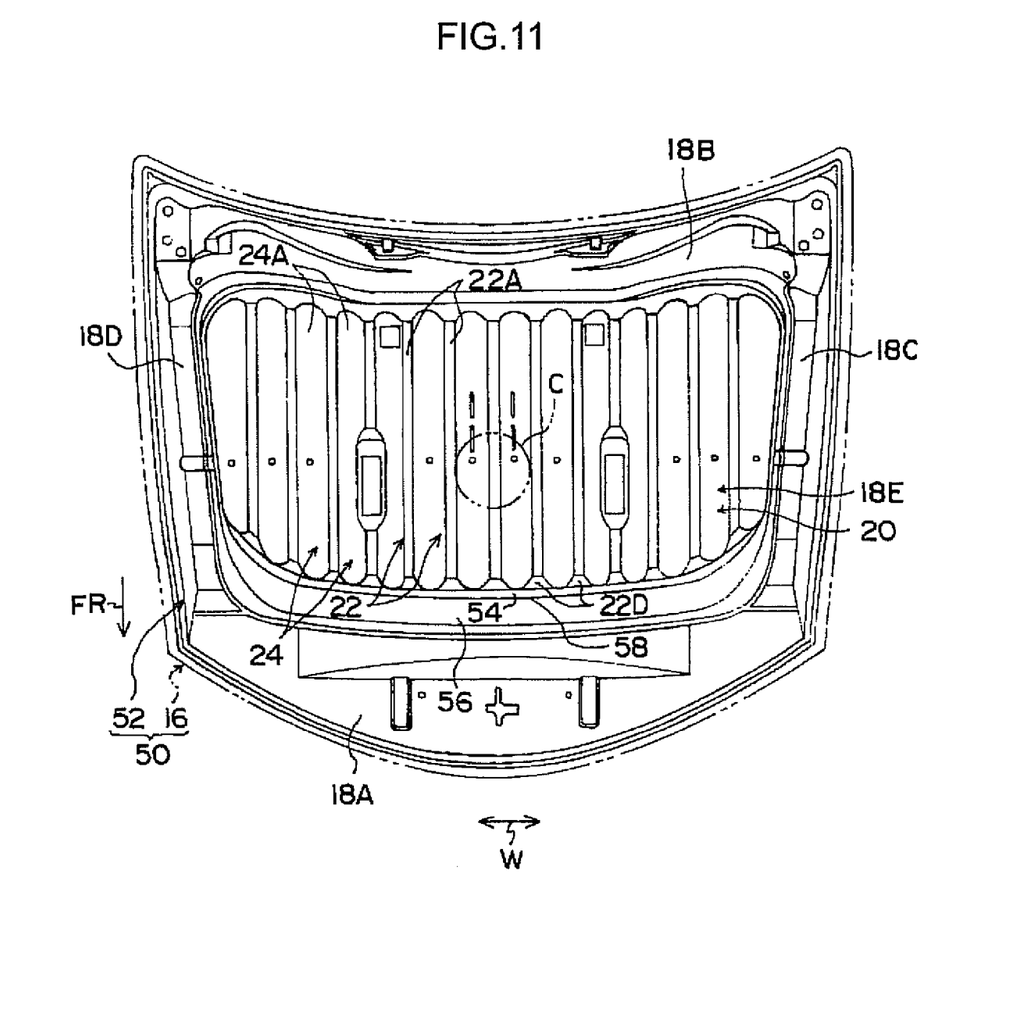
FIG. 11 is a plan view illustrating a hood applied with a vehicle hood structure of a second exemplary embodiment of the present invention (with elements such as a hood outer panel shown in a see-through state).

Explanation follows regarding a vehicle hood structure according to a second exemplary embodiment of the present invention, with reference to FIG. 11. FIG. 11 is a plan view illustrating a hood 50 applied with the vehicle hood structure according to the second exemplary embodiment of the present invention, with some elements such as a hood outer panel 16 (see the double-dash intermittent lines) illustrated in a see-through state.

As shown in FIG. 11, a hood inner panel 52 of the hood 50 differs slightly in the shape of the front end portion of a central region 18E from the hood inner panel 18 (see FIG. 1, etc.) of the first exemplary embodiment. Other parts of the configuration are effectively the same as in the first exemplary embodiment. Accordingly, configuration elements effectively the same as in the first exemplary embodiment are given the same reference numerals and further explanation thereof is omitted.

A hood front-rear direction front end portion 22D of each bead 22 reaches the vicinity of a front edge portion 18A of the hood inner panel 52, and the front end portions 22D are arranged in a line in hood plan view. More specifically, the shape of the termination of the front end portions 22D of each of the beads 22 (the shape formed by the positions where they rise up) forms a circular arc shape of large radius in hood plan view, and the terminal positions (starting positions) of the beads 22 are set on a (gentle) imaginary circular arc shaped curved line of large radius running substantially along the hood width direction as seen in hood plan view.

A hood front-rear direction front end portion of the central region 18E of the hood inner panel 52 is formed with a front wall section 56 running substantially along the hood width direction in a circular arc shape with large radius, in hood plan view. The front wall section 56 is provided further to the hood front side than a wave shaped section 20, and is inclined towards the hood bottom side on progression towards the hood front.

The hood inner panel 52 is further formed with a ledge section 54 that connects together the wave shaped section 20 and the front wall section 56 and is formed substantially along the hood width direction in a circular arc shape of large radius, in hood plan view. The ledge section 54 is formed with a flat profile, with a hood top-bottom direction step formed between apex portions 22A of the beads 22 and the ledge section 54. A ridge line 58 at the connection location between the ledge section 54 and the front wall section 56 is formed substantially along the hood width direction in a circular arc shape of large radius in hood plan view.

According to the configuration of the present exemplary embodiment, substantially the same operation is achieved to as described in the first exemplary embodiment, enabling impact absorption ability prior to secondary impact to improved when the head impactor C (impacting body) impacts the hood 50.

<Supplementary Explanation of Exemplary Embodiments>

Note that in the above exemplary embodiments the rigidity of the front wall section 28, 56 with respect to the impact load f can be adjusted by adjusting such factors as the angle of inclination of the front wall section 28, 56, the extension direction of the ridge line 30, 58, and/or the position of the ledge section 26, 54. Such adjustments enable the load prior to secondary impact to be controlled. For example, if the angle of inclination of the front wall section 28, 56 with respect to the horizontal direction is set smaller than in the exemplary embodiments described above, the deformation load of the front wall section 28, 56 when the head impactor C impacts the hood 14, 50 can be made smaller than in the exemplary embodiments described above.

In the exemplary embodiments described above, the apex portions 22A of the beads 22 (protruding portions) in the wave shaped section 20 are formed with a flat profile, and the bottom portion 24A sides of the indented portions 24 are formed in a curved circular arc shape (curved shape) as seen in a cross-section taken along the hood width direction. However, the apex portion side of the protruding portions of the wave shaped section 20 may be formed in a curved circular arc shape (curved shape) as seen in a cross-section taken along the hood width direction, and the bottom portions of the indented portions of the wave shaped section may be formed with a flat profile. The bottom portions of the indented portions of the wave shaped section may also be set so as to lie in the same plane as the ledge section.

In the exemplary embodiments described above, the hood front-rear direction front end portions 22B, 22D of the plural beads 22 (protruding portions) of the wave shaped section 20 are all arranged in a line in hood plan view. Such a configuration is preferable, however configuration may be made in the wave shaped section such that, for example, the majority of the hood front-rear direction front end portions 22B, 22D of the plural beads (protruding portions) are arranged in a line in hood plan view (a majority preferably including front end portions in the hood width direction central portion).

The invention claimed is:

1. A vehicle hood structure comprising:
   a hood outer panel that configures an outer panel of a hood;
   a hood inner panel that is disposed at a hood bottom side of the hood outer panel and that is coupled to the hood outer panel to configure an inner panel of the hood; and
   a dent reinforcement that is disposed at a central region of a hood front end portion, between the hood outer panel and the hood inner panel towards a hood outer panel side, and is joined to the hood outer panel to provide reinforcement;
   the hood inner panel includes a wave shaped section, a front wall section, and a ledge section,
   the wave shaped section is provided at a central region of the hood inner panel and that includes protruding portions oriented with a length direction in a hood front-rear direction to give protruding shapes on the hood outer panel side, and indented portions oriented with a length direction in the hood front-rear direction to give indented shapes on the hood outer panel side, the protruding portions and the indented portions provided alternately to form a wave shaped profile, and with hood front-rear direction front end portions of the protruding portions arranged in a line in a hood plan view;

the front wall section is provided to the hood inner panel further to a hood front side than the wave shaped section, that is inclined towards the hood bottom side on progression towards a hood front, and that is formed substantially along the hood width direction; and the ledge section connects together the wave shaped section and the front wall section in the hood inner panel substantially along the hood width direction, that is formed with a flat profile over the entire region, that set with a rigidity lower than that of the wave shaped section, and that is not connected to the dent reinforcement;

wherein front end portions of the protruding section of the wave shaped section meet the ledge section, and front edges of the front end portions of the protruding section are arranged in a straight line shape along the hood width direction in a hood plan view, so that each of the front end portions of the protruding section is formed in a trapezoid shape in a hood plan view in the hood front-rear direction from the front edge thereof.

2. The vehicle hood structure of claim 1 wherein a ridge line configuring the location of connection between the ledge section and the front wall section is formed along the hood width direction in a straight line shape in the hood plan view.

* * * * *